US010769685B2

(12) United States Patent
Marlowe et al.

(10) Patent No.: US 10,769,685 B2
(45) Date of Patent: Sep. 8, 2020

(54) SYSTEMS AND METHODS FOR ELECTRONICALLY GENERATING AND ANALYZING SHIPPING PARAMETERS

(71) Applicants: Phillip Marlowe, Weddington, NC (US); William Robbins, San Antonio, TX (US)

(72) Inventors: Phillip Marlowe, Weddington, NC (US); William Robbins, San Antonio, TX (US)

( * ) Notice: Subject to any disclaimer, the term of this patent is extended or adjusted under 35 U.S.C. 154(b) by 525 days.

(21) Appl. No.: 15/185,817

(22) Filed: Jun. 17, 2016

(65) Prior Publication Data
US 2016/0300277 A1    Oct. 13, 2016

Related U.S. Application Data

(63) Continuation-in-part of application No. 14/698,682, filed on Apr. 28, 2015, which is a continuation of
(Continued)

(51) Int. Cl.
| | |
|---|---|
| G06Q 30/04 | (2012.01) |
| H04L 29/08 | (2006.01) |
| G06Q 40/00 | (2012.01) |
| G06F 8/65 | (2018.01) |
| G06F 3/0481 | (2013.01) |

(Continued)

(52) U.S. Cl.
CPC ........... *G06Q 30/04* (2013.01); *G06F 3/0481* (2013.01); *G06F 8/65* (2013.01); *G06Q 10/083* (2013.01); *G06Q 40/12* (2013.12); *G06Q 50/28* (2013.01); *H04L 67/10* (2013.01); *H04W 4/024* (2018.02)

(58) Field of Classification Search
None
See application file for complete search history.

(56) References Cited

U.S. PATENT DOCUMENTS

| 7,693,791 B2 | 4/2010 | Hahn-Carlson et al. |
| 9,047,580 B1 | 6/2015 | Marlowe et al. |
| | (Continued) | |

OTHER PUBLICATIONS

U.S. Appl. No. 14/698,682, Non Final Office Action dated May 24, 2017, 10 pages.
(Continued)

*Primary Examiner* — Paul Danneman
(74) *Attorney, Agent, or Firm* — Kilpatrick Townsend & Stockton LLP

(57) ABSTRACT

One illustrative method includes receiving a first data set associated with a shipping manifest from a first shipping entity. The method also includes receiving a second data set associated with a user preference. The method additionally includes generating a shipping matrix based on the first data set and the second data set. The method also includes receiving a third data set associated with an invoice and including a first shipping cost. The method additionally includes determining a particular row of the shipping matrix based on the third data set. The method also includes determining a second shipping cost based on data from the particular row of the shipping matrix. The method further includes determining if the first shipping cost is within a predefined tolerance range of the second shipping cost.

20 Claims, 8 Drawing Sheets

Related U.S. Application Data application No. 12/190,961, filed on Aug. 13, 2008, now Pat. No. 9,047,580.

(60) Provisional application No. 60/964,505, filed on Aug. 13, 2007.

(51) Int. Cl.
*G06Q 50/28* (2012.01)
*H04W 4/024* (2018.01)
*G06Q 10/08* (2012.01)

(56) References Cited

U.S. PATENT DOCUMENTS

| | | |
|---|---|---|
| 10,373,266 B2 | 8/2019 | Marlowe et al. |
| 2002/0069096 A1 | 6/2002 | Lindoerfer et al. |
| 2004/0143547 A1 | 7/2004 | Mersky et al. |
| 2005/0246240 A1 | 11/2005 | Padilla |
| 2006/0015418 A1 | 1/2006 | Holmes et al. |
| 2007/0179870 A1* | 8/2007 | Goodbody ............ G06Q 20/10 705/30 |
| 2011/0022533 A1* | 1/2011 | Lau ....................... G06Q 10/00 705/332 |
| 2014/0058971 A1* | 2/2014 | Muppirala ......... G06Q 10/0831 705/333 |
| 2015/0242966 A1 | 8/2015 | Marlowe et al. |

OTHER PUBLICATIONS

U.S. Appl. No. 14/698,682, "Final Office Action", dated Feb. 16, 2018, 9 pages.

U.S. Appl. No. 14/698,682, "Advisory Action", dated May 24, 2018, 2 pages.

* cited by examiner

SYSTEMS AND METHODS FOR ELECTRONICALLY GENERATING AND ANALYZING SHIPPING PARAMETERS

CROSS REFERENCE TO RELATED APPLICATIONS

This application is a continuation-in-part of co-pending U.S. patent application Ser. No. 14/698,682, filed Apr. 28, 2015, entitled "Method, System, and Computer Readable Medium for Electronic Auditing," which is a continuation of U.S. patent application Ser. No. 12/190,961, filed on Aug. 13, 2008, now U.S. Pat. No. 9,047,580, issued May 13, 2015, entitled "Method, System, and Computer Readable Medium for Electronic Auditing," which claims priority to U.S. Provisional Patent Application No. 60/964,505, filed Aug. 13, 2007, entitled "Systems, Methods, and Computer Readable Media for Electronic Invoice Auditing," the entirety of all of which are hereby incorporated by reference herein.

FIELD OF INVENTION

The following description generally relates to generation and analysis of electronic parameters. More specifically, the following description relates to electronically generating and analyzing shipping parameters.

BACKGROUND

Shipping companies are increasingly using computers to perform tasks. But this may require each shipping company to run their own software, on their own computers, to perform such tasks. Thus, each company may have to purchase expensive hardware and software; stay on top of security, software, and hardware updates; and devote considerable time and resources (e.g., money and IT personnel) to maintaining their computer infrastructure. What is needed is a faster, cheaper, and more convenient way to perform shipping-related computer tasks.

Further, shipping goods has become increasingly complex. For example, as a company's suppliers and customers expand to neighboring states and locations around the world, it can become necessary to coordinate shipments among multiple different consignees, shippers, ports, and carriers. What is needed is a simpler, cheaper, and more efficient way to analyze shipment data and coordinate shipments among entities.

SUMMARY

Some embodiments of the present disclosure can automatically generate and analyze shipping parameters. This may reduce expenses associated with the transport of goods, improve the invoicing process by making invoice processing and payment more efficient and accurate, and/or provide new information usable in a variety of shipping contexts.

In one embodiment, a system of the present disclosure may comprise a memory device and a processor in communication with the memory device. The processor may be configured to receive a first data set associated with a shipping manifest from a first shipping entity. The processor may also be configured to receive a second data set associated with a user preference. The processor may also be configured to generate a shipping matrix associated with a plurality of shipping routes based at least in part on the first data set and the second data set. The processor may also be configured to receive a third data set associated with an invoice and comprising a first shipping cost. The processor may also be configured to determine a particular row of the shipping matrix based on the third data set. The processor may also be configured to determine a second shipping cost based on data from the particular row of the shipping matrix. The processor may also be configured to determine whether the first shipping cost is within a predefined tolerance range of the second shipping cost.

In another embodiment, a method of the present disclosure may comprise receiving a first data set associated with a shipping manifest from a first shipping entity. The method may also comprise receiving a second data set associated with a user preference. The method may also comprise generating a shipping matrix based on the first data set and the second data set. The method may also comprise receiving a third data set associated with an invoice and including a first shipping cost. The method may also comprise determining a particular row of the shipping matrix based on the third data set. The method may also comprise determining a second shipping cost based on data from the particular row of the shipping matrix. The method may also comprise determining if the first shipping cost is within a predefined tolerance range of the second shipping cost. Yet another embodiment comprises a computer-readable medium for implementing such a method.

Some embodiments may be implemented via a cloud server in a cloud-computing environment. This may reduce or eliminate the need for shipping entities to purchase expensive hardware and software; stay on top of security, software, and hardware updates; and devote considerable time and resources (e.g., money and IT personnel) to maintaining their computer infrastructure.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF DRAWINGS

A full and enabling disclosure is set forth more particularly in the remainder of the specification. The specification makes reference to the following appended figures.

DETAILED DESCRIPTION

Figure 1:
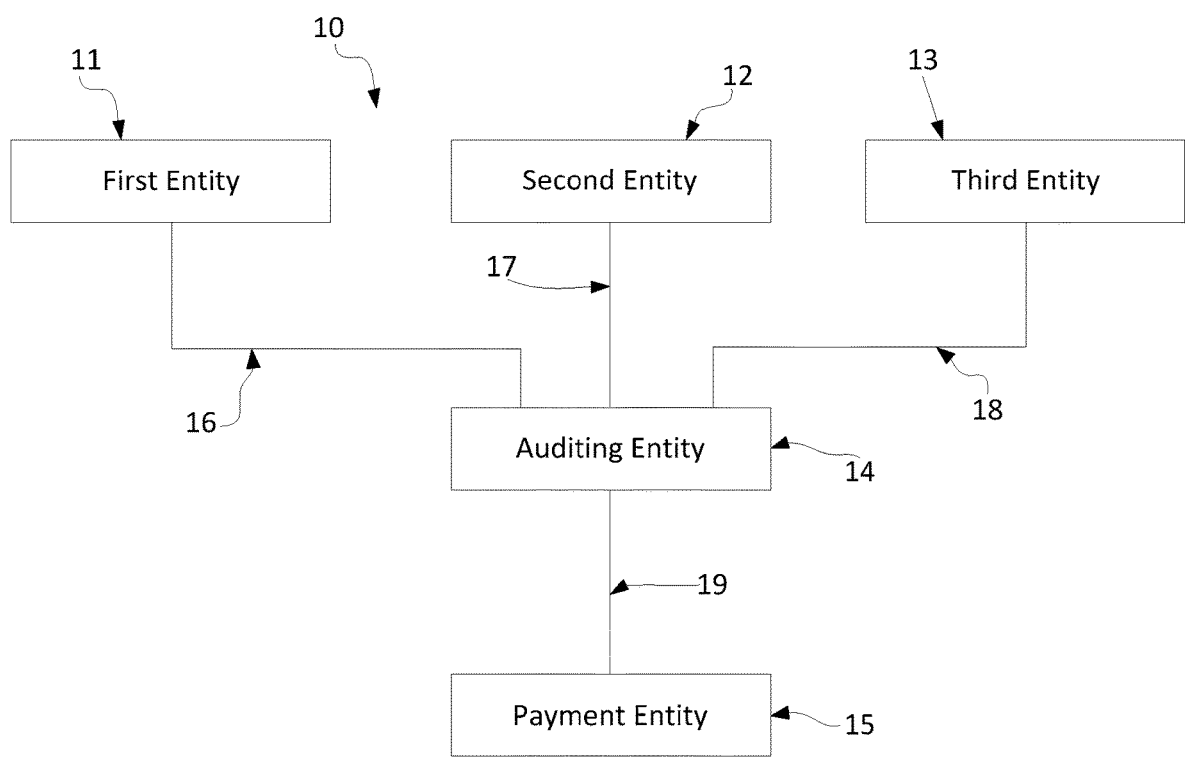
FIG. 1 shows an embodiment of a system for generating and analyzing shipping parameters.

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Electronically Generating and Analyzing Shipping Parameters One illustrative embodiment of the present disclosure comprises a computing device configured to automatically and electronically audit a shipping invoice (e.g., provided by a shipping entity to a sender of goods) to determine if a shipping cost (e.g., a shipping rate) is accurate. For example, the computing device can receive data associated with an invoice from a shipping entity. The invoice can be associated with the transport of goods from a sender of the goods to a recipient of the goods. In the illustrative embodiment, the computing device selects a particular row associated with the sender of the goods and the recipient of the goods from a shipping matrix (e.g., a matrix of shipping parameters). The shipping matrix can include multiple rows of data, with each row of data being associated with a shipping route for transporting goods between a particular sender of goods and a particular recipient of goods. In the illustrative embodiment, the computing device determines a first shipping cost associated with data from the selected row of the shipping matrix. In the illustrative embodiment, the computing device compares the first shipping cost to a second shipping cost from the invoice. Based on the comparison, the computing device determines if the second shipping cost from the invoice is accurate. For example, the computing device may determine that the second shipping cost is accurate if the second shipping cost is within a predefined tolerance range of the first shipping cost.

In the illustrative embodiment, the computing device is configured to generate at least a portion of the shipping matrix using data from a shipping manifest, user preferences, and/or contract data. For example, in the illustrative embodiment, the computing device is configured to receive a first data set (e.g., from a remote computing device, server, a database, or a local memory). The first data set may comprise data from a shipping manifest, such as a shipping entity, a consignee, a carrier, a shipping date, etc.

In the illustrative embodiment, the computing device is also configured to receive a second data set. The second data set may comprise one or more user preferences, such as a desired shipping route to be taken by a particular shipper of goods.

In the illustrative embodiment, the computing device is also configured to receive a third data set. The third data set may comprise contract data, such as data associated with a shipping rate agreement and/or a service provider agreement between two entities. In some embodiments, the contract data comprises an effective date (e.g., for a contract or other relationship) and/or an expiration date (e.g., for a contract or other relationship).

In the illustrative embodiment, the computing device is configured to generate at least a portion of the shipping matrix based at least in part on the first data set, the second data set, and/or the third data set. For example, each row in the shipping matrix may comprise a shipping entity, a consignee, a carrier, an effective date, an expiration date, a bill of lading origin, a port of loading, a port of discharge, a bill of lading discharge location, and/or other shipping route parameters. The computing device may determine the shipping entity, the consignee, and/or the carrier from the first data set (e.g., associated with the shipping manifest). The computing device may determine the effective date and/or the expiration date from the third data set (e.g., associated with the contract data). The computing device may determine the bill of lading origin, the port of loading, the port of discharge, and/or the bill of lading discharge location based at least in part on the second data set (e.g., associated with user preferences).

For example, in one embodiment, the computing device determines the bill of lading origin, port of loading, port of discharge, bill of lading discharge location, and/or other parameters by mapping data from the first data set to each respective parameter using a lookup table. For example, the computing device may use a lookup table to map a shipping entity (e.g., Hono Consol Center) to a particular bill of lading origin (e.g., Compton), a particular port of loading (e.g., Los Angeles), a particular port of discharge (e.g., Honolulu), a particular bill of lading discharge location (e.g., Honolulu), or any combination of these. In such an embodiment, the computing device may use the second data set as a constraint when mapping between parameters using the lookup table.

As discussed above, in the illustrative embodiment, the computing device selects a particular row from the shipping matrix associated with a particular sender of goods and a particular recipient of the goods. The computing device can then determine a first shipping cost associated with a particular shipping route between the sender of the goods and the recipient of the goods based on data from the selected row of the shipping matrix. For example, the computing device can use a lookup table or algorithm to determine the shipping cost for the particular shipping route based on a corresponding shipping entity, consignee, carrier, effective date, expiration date, bill of lading origin, port of loading, port of discharge, bill of lading discharge, and/or other parameter.

As also discussed above, in the illustrative embodiment, the computing device compares the first shipping cost to a second shipping cost from an invoice. For example, in the illustrative embodiment, the computing device is configured to receive a fourth data set (e.g., from a remote computing device, server, database, or a local member). The fourth data set may comprise data from an invoice that includes the second shipping cost. In some embodiments, the computing device compares the first shipping cost to the second shipping cost to determine if a discrepancy exists. For example, the computing device may determine if the second shipping cost is within a predefined tolerance range (e.g., a predefined monetary difference) of the first shipping cost. If so, the computing device may allow payment of the invoice. If not, the computing device may block payment of the invoice and/or notify an entity of the discrepancy. Thus, in some embodiments, a shipping cost from an invoice can be automatically and electronically audited for accuracy (e.g., based on data from a shipping matrix).

Illustrative Systems and Methods for Electronically Generating and Analyzing Shipping Parameters In some embodiments, a method may comprise receiving a first data source comprising a first data set; receiving a second data source comprising a second data set; generating a record based at least in part on a portion of the first data set and/or at least a portion of the second data set; and/or auditing (e.g., electronically analyzing) the record. In some embodiments, the first data source can comprise a manifest. In some embodiments, the second data source can comprise an invoice.

In some embodiments, the first data set and/or the second data set can comprise at least one of the following: carrier identification, shipment identification information, bill of lading identification information, purchase order identification information, purchase order location, shipping company identification, consignee identification, vessel identification, carrier identification, shipment origination information, shipment destination information, shipment date information, arrival date information, invoice identification information, shipment rate information (e.g., cost), shipped item identification, shipped commodity information, shipment volume, shipment quantity, shipment weight, container identification information, container size, quantity of containers, carton quantity, carton identification information, and carton contents.

In some embodiments, the method further comprises determining a first plurality of shipping parameters based on the first data set. The first plurality of shipping parameters may comprise a shipping company identification, a consignee identification, a carrier identification, or any combination of these.

In some embodiments, the method further comprises receiving a third data source comprising a third data set. The method further comprises generating the record and/or performing the audit based at least in part on the third data set. The third data source may comprise contractual terms supplied by a company, instructions from an auditing entity, and/or modifications by an auditing entity. In some embodiments, the third data source can comprise other invoices and/or manifests issued by an entity. The record can be comprised of at least a portion of the third data set.

In some embodiments, the method further comprises receiving a fourth data source comprising a fourth data set. The fourth data set may comprise one or more user preferences. In some embodiments, the user preferences can include a particular shipper, consignee, carrier, an expiration date for one or more user preferences, or any combination of these. For example, a user may select a particular shipper, carrier, and/or consignee to use for one or more transactions or shipments prior to the expiration date. The method may further comprise generating the record and/or performing the audit based at least in part on the fourth data set.

In some embodiments, the method further comprises transforming the first plurality of shipping parameters into a second plurality of shipping parameters. In some embodiments, the first plurality of shipping parameters can be transformed into the second plurality of shipping parameters based at least in part on at least one contract term (e.g., from the third data set) and/or at least one user preference (e.g., from the fourth data set). The second plurality of shipping parameters may comprise a bill of lading origin, a bill of lading destination, a port of loading, a port of discharge, or any combination of these.

In some embodiments, generating the record comprises transforming the first plurality of shipping parameters into the second plurality of parameters. In such an embodiment, the record may comprise any combination of the first plurality of shipping parameters and/or the second plurality of shipping parameters.

In some embodiments, the method further comprises determining one or more comparison shipping rates based on the first data set, first plurality of shipping parameters, second data set, the second plurality of shipping parameters, the third data set, the fourth data set, or any combination of these. For example, the method may determine a shipping path based on one or more of the second plurality of shipping parameters (e.g., a bill of lading origin, a bill of lading destination, a port of loading, and/or a port of discharge). In some embodiments, the method may determine a comparison shipping rate based on the shipping path and/or one or more of the first plurality of shipping parameters (e.g., the shipper, carrier, and/or consignee). For example, a lookup table stored in memory can be accessed or one or more algorithms can be used to determine a shipping rate for a particular shipper to transport cargo along the determined shipping path. In some embodiments, the method may additionally or alternatively determine the comparison shipping rate based on the first data set. For example, the method may additionally or alternatively determine the comparison shipping rate based on a container size, shipment weight, and/or carton contents obtained from the first data set.

In some embodiments, conducting the audit of the record comprises comparing a comparison shipping rate to a shipping rate from an invoice to determine a discrepancy between the two. For example, some embodiments comprise comparing a comparison shipping rate to a shipping rate from an invoice to determine whether the shipping rate from the invoice is within a predefined tolerance range of the comparison shipping rate. If so, the record may pass the audit. If not, the record may fail the audit.

In some embodiments, the method further comprises authorizing payment of an invoice upon completion of the audit. If the record passes the audit, the method can comprise generating an approval notification. If the record fails the audit, the method can comprise generating a failure notification. In some embodiments, when the audit fails, a discrepancy notice can be generated. In some embodiments, the discrepancy notice can be sent to an auditing entity which may analyze the record and the noted discrepancy.

In embodiments where a discrepancy notice has been generated, the auditing entity can provide a mechanism where an entity can submit a replacement data source. The replacement data source can comprise a replacement data set. The replacement data set may comprise a set of data intended to resolve the discrepancy. In some embodiments, the replacement data source then can be used to generate a replacement record that can be audited. In other embodiments, a new shipping rate or other data from the replacement data source can be audited (e.g., against a comparison shipping rate).

In some embodiments, the present disclosure can provide systems and methods for electronically generating and analyzing shipping parameters. In some embodiments, systems and methods of the present disclosure can identify discrepancies in the invoicing and payment process before the invoice has been paid. When the discrepancy is identified before payment, the carrier can be notified, and the company can be alerted to prevent payment under the wrong terms.

Conventionally, upon receipt of an invoice from a carrier, a company may submit an invoice for payment. For even a medium-sized company, a large number of invoices for various products and goods may be received daily. To ensure timely delivery, the invoice may be received and paid without auditing the invoice to determine the accuracy of the invoice. Conventionally, an audit, if one occurs, often occurs after the goods or products have been delivered.

Some embodiments described herein may provide improvements upon the invoicing process by performing an efficient and accurate audit before any payments have been remitted. In some embodiments, payment of an invoice does not occur until the invoice has been approved by systems and methods according to the present disclosure.

The present disclosure relates generally to systems and methods for electronically generating and analyzing shipping parameters. In some embodiments, a company may utilize a logistics entity, a carrier, an auditing entity, a payment entity, and/or other entities to handle various aspects of the shipping process. In other embodiments, the company may utilize another business structure for handling various aspects of the shipping process. The method and system described herein can be practiced with any number and configuration of businesses and business structures, such as, but not limited to: a company, auditing entity, and carrier; a company, logistics entity, an auditing entity, and carrier; a company, carrier, auditing entity, and payment entity; and/or a company and a carrier. In some embodiments, entities may be a division of the company or a separate company along with any other business relationship that can be utilized within the industry. The company may utilize a structure that integrates any or each of the entities into its business organization. For example, the company may choose to have a department integrated internally to perform the actual payment of the invoices rather than engage an outside entity to perform the payment of all invoices. This and any other business organization structures are contemplated within the scope of the present disclosure. Additionally, embodiments are not limited to use with international ocean freight shipping or air freight situation, as other applications are also contemplated within the scope of the description herein.

In some embodiments, an audit comprises analyzing at least a portion of an electronic document and/or at least a portion of an electronic record to determine the accuracy of the contents therein (e.g., to verify the accuracy of the contents). For example, an audit may comprise analyzing the rate or cost for a shipment, the contents of shipment, and/or the identity of the containers to determine the accuracy thereof.

Some embodiments comprise an application accessed through an Internet web-based portal which receives information, analyzes the information, and audits at least a portion of the information. In another embodiment, a computer-readable medium comprises program code for carrying out such a method. In some embodiments, the shipping is international. In some embodiments, the shipment can take place via ocean freight. In other embodiments, the shipment can take place via air freight. In yet other embodiments, the shipment can take place via land freight.

Some embodiments may eliminate the need of a paper-battle back and forth after the payment has been sent in order to settle disputes of charges and services. This may allow a company to have access to its capital for a greater amount of time and may provide some greater level of assurance that the payment is correct. Some embodiments can audit the information from a record, and not just a dollar amount on an invoice. In some embodiments, the record can be manipulated without distorting the invoice or other documents.

Some embodiments can provide an audit of an invoice received for the shipment of goods and products. Some embodiments provide a pre-payment audit of an invoice. The audit can include checking that the terms included on an invoice correspond to the terms included on a corresponding manifest through a shipment record. In some embodiments, the audit can include checking a shipping rate provided in an invoice against a determined shipping rate generated by a computing device. Thus, errors and discrepancies on the invoice can be identified before payment has been submitted. Appropriate corrections and/or modifications can be quickly and efficiently made in order to minimize the resources that go along with a dispute.

Some embodiments can electronically audit an invoice by comparing the manifest and the invoice through the creation of a record. In some embodiments, the record can comprise a shipment record. In some embodiments, the record can be generated using at least a portion of the data from the manifest and/or the invoice. The record can provide a structure that works in tandem with the invoice. The record can serve as a repository for data from a plurality of sources. In some embodiments, data fields of the record may be populated with information from both the manifest and the invoice. A comparison can be automatically made within the data fields of the record. The audit can be performed electronically. In some embodiments, the comparison can be conducted automatically. In some embodiments, methods can be conducted in a portal environment on a web-based application. In some embodiments, the comparison can be performed through the use of a processor. The information may be shared among the customer, the supplier, the carrier, and other parties of interest.

In some embodiments, if the terms match between a manifest and an invoice, the invoice can be approved for immediate payment. In some embodiments, the approval may be automatic. In some embodiments, if the terms within the record that are populated by data from the manifest and the invoice are substantially consistent, the invoice can be authorized for payment. Substantially consistent means that the terms are substantially consistent within a defined range of tolerances. In some embodiments, if the terms between a manifest and invoice differ, an electronic review by an auditing entity can be performed. The auditing entity can identify the discrepancy or discrepancies between a manifest and an invoice. In some embodiments, once a discrepancy has been identified, the auditing company can approve the payment of the invoice if the discrepancy is of a minor nature. In other embodiments, once a discrepancy has been identified, the auditing company may flag the discrepancy and draw it to the attention of the entities involved. In some embodiments, the flagging and notification of the discrepancy may provide notice so that a quick resolution may occur before the invoice has been paid. If an entity, such as a carrier, agrees the discrepancy is in error on its behalf, then the carrier can resubmit a corrected invoice. If the entity is not in agreement with the source of the discrepancy, the entity can engage the parties in a process to resolve the dispute. In some embodiments, the invoice may not be paid until all parties are in agreement with the terms of the invoice.

The pre-payment audit according to some embodiments described herein can achieve a number of benefits for the parties involved. For example, the audit can identify that the invoice is the correct invoice for the company; identify that it is proper for the company to pay the invoice; determine whether the invoice has already been paid; determine whether materials or services on the invoice is something that has already been paid for on a separate invoice; determine that the invoice is the company's and has not been paid yet; and determine whether the invoice is for the right bundle of services.

In some embodiments, a web-based program can provide a populated shipment record. The shipment record can provide a repository useful for the auditing of shipping invoices. An authorized user may access the shipment record through a network, such as the Internet, in order to obtain current information relating to a shipment. Any standard web server application may be utilized. The web server can respond to Hypertext Transfer Protocol (HTTP) requests by executing code. The web server may be a single computer system, or may be implemented as a network of computer processors. Examples of web servers are mainframe computers, networked computers, a processor-based device, and similar types of systems and devices.

The web server can comprise a processor, which, in turn, can be in communication with a computer-readable medium. The processor comprises a computer-readable medium, such as a random access memory (RAM) coupled to the processor. The processor executes computer-executable program instructions stored in memory, such as executing one or more computer programs for generating a record. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The instructions may comprise code from any suitable computer-programming language, including, for example, .NET, C, C++, C #, Visual Basic, Java, Python, Perl, and JavaScript. The processor, and the processing, described may be in one or more structures, and may be dispersed through one or more structures. The processor may comprise code for carrying out one or more of the methods (or parts of methods) described herein.

The processor may be in communication with any number of other external or internal devices such as a mouse, a CD-ROM, a keyboard, a display, or other input or output devices.

The web server may be in communication with a network, such as the Internet. Accordingly, a user may access the shipment record on the web server over the Internet. For example, a user may access the shipment record via a web portal, by entering a user identifier and a password. The web portal may be accessible through a browser, such as Microsoft's Internet Explorer™, or Mozilla's Firefox™.

In some embodiments, a shipping company may generate a manifest. In some embodiments, the manifest can be generated by a logistics entity. The manifest can contain information which describes and characterizes the shipment. The manifest can serve as shipping notification that is sent to the company to notify the entity of the shipment.

The manifest may comprise logic groups of data called data fields. Each data field may be made up of one or more data elements. In some embodiments, the manifest contains information identifying the shipment. A manifest can comprise a plurality of data fields and data elements, for example, but not to be considered limiting, the plurality of data fields can comprise at least one of the following: carrier identification, shipping rate, shipment identification information, bill of lading identification information, shipping company identification, shipment origination information, shipment destination information, shipment date, vessel identification, arrival date information, purchase order identification information, shipped item identification, shipped commodity information, container identification information, container size, quantity of containers, shipment volume, shipment quantity, shipment weight, shipment rate, carton quantity, carton identification information, and carton contents.

In some embodiments, the manifest may be an 856/ASN. The 856/ASN refers to an electronic shipping manifest that may comprise detailed shipping information such as purchase order number, total number of cartons, carton serial numbers, contents of each carton tied to specific line items on a specific purchase order, carrier that accepted the shipment, shipment date, or other like information. The manifest can be created at the time of shipment and sent by the supplier or logistics entity to the customer so that it may arrive before the shipment arrives. The customer can hold the manifest to wait for the physical shipment to arrive. In some embodiments, the manifest can be sent directly to an auditing entity.

In some embodiments, the manifest can be submitted electronically to the auditing entity. The information contained on the manifest can be extracted and used to populate a shipment record. The shipment record can contain particular extracted information from the manifest. This information can be used to audit a corresponding invoice, as will be discussed in further detail below.

In some embodiments, one or more carriers may generate one or more documents for each shipment. For example, a carrier may generate an invoice for each shipment. In some embodiments, the documents may be generated electronically and/or be electronic documents. The documents may comprise identifying information about each shipment. For example, document may comprise at least one of the following: carrier identification, shipment identification information, bill of lading identification information, purchase order identification information, purchase order location, shipping company identification, consignee identification, vessel identification, carrier identification, shipment origination information, shipment destination information, shipment date, arrival date information, invoice identification information, shipment rate, shipped item identification, shipped commodity information, shipment volume, shipment quantity, shipment weight, container identification information, container size, quantity of containers, carton quantity, carton identification information, and carton contents.

The information included on the document can be extracted and used to populate a plurality of data fields within the shipment record. The shipment record can contain particular extracted information from the document. This information can be used to audit the invoice, as will be discussed in further detail below.

Some embodiments can generate a record. The record can be used to audit an invoice. In some embodiments, a record comprises an electronic document, structure, web browser page, portal, or other form comprising a repository of data. The record can comprise or be referred to as a shipment record. The shipment record may comprise a separate document from the manifest and the invoice. In some embodiments, at least one processor extracts certain information from the manifest and/or the invoice and inputs the information into the shipment record. In some embodiments, the shipment record can be generated by an auditing entity.

In some embodiments, the shipment record comprises a record that serves as a discrete document or repository where information from a plurality of sources can be stored and/or directly compared. In some embodiments, the shipment record can be presented in a portal environment.

The shipment record can contain a plurality of data fields. In some embodiments, the data fields may comprise at least one of the following: carrier identification, shipping company identification, consignee identification, an effective date (e.g., of a contract or relationship), an expiration date (e.g., for a contract, relationship, or a set of user preferences), a bill of lading origin, a bill of lading destination, a port of loading, a port of discharge, shipment identification information, other bill of lading information, shipment origination information, shipment destination information, shipment date, vessel identification, arrival date information, purchase order identification information, shipped item identification, shipped commodity information, container identification information, container size, quantity of containers, shipment volume, shipment quantity, shipment weight, shipment rate, carton quantity, carton identification information, and carton contents.

In some embodiments, the shipment record may comprise a shipping matrix. Each row of the shipping matrix can include information associated with a shipping route between a sender of goods and a recipient of goods. For example, each row of the matrix can include a shipping company identification, carrier identification, consignee identification, an effective date, an expiration date, a bill of lading origin, a port of loading, a bill of lading destination, a port of discharge, a shipping rate or cost (e.g., based on the above parameters specified in the row of the matrix), or any combination of these. In such an embodiment, the shipment record can be generated based at least in part on: at least one user preference, at least one contract term, data from a manifest, and/or any other data. An example of such a shipment record will be described in greater detail with respect to FIG. 5.

In some embodiments, the shipment record serves as a repository for the extracted data from a plurality of sources. The data fields can be populated by a plurality of sources. The plurality of sources may comprise a manifest, an invoice, a contract or contract term, SKUs, commodity identifications, and other information and sources. In some embodiments, the data fields can be populated by the auditing entity. In some embodiments, the data fields can be populated by a combination of any or all of the previously recited sources.

In some embodiments, a memory can contain program code configured to cause the processor to perform one or more aspects of any of the embodiments described herein. For example, the memory may comprise program code configured to cause the processor to identify particular information that corresponds to each data field, extract the information from one or more data sources, and input the information into a corresponding data field within the shipment record.

In some embodiments, the shipment record can include data fields that can be updated by an auditing entity. For example, the shipment record can include updateable audit status data fields, internal comments data fields, public comments data fields, discrepancy reasons data fields, and other updateable data fields.

Some embodiments provide an authorization process to provide secured access to the shipment record. In such an embodiment, the shipment record may be viewed by authorized users. Authorized users can include the auditing entity, the company, the logistics entity, the carrier, the payment entity, and any other entity that has been granted access by the auditing entity. Different levels of access can be granted to each authorized user. In some embodiments, an authorized user can be granted full access that may include capabilities of manipulating the shipment record. In some embodiments, an authorized user can be granted less user access, for example, access to only comment editing or other restricted field editing. In some embodiments, an authorized user may be granted view-only access, through which the authorized user may only be able to view the contents of the shipment record.

In some embodiments, the shipment record can be manipulated and/or modified. In the event that the shipment record is modified, an audit trail can be generated. The audit trail can comprise a record of the particular modification, the identity of the authorized user that made the modification, the time and date in which the modification has been made, any comments by an authorized user, and/or other like information. The shipment record can include a data field that provides a history of modifications and the appropriate time stamp for each modification.

In some embodiments, an audit is performed in which at least one piece of data (e.g., a data field of the shipment record and/or from the invoice) is compared to another piece of data to determine if a discrepancy exists between the two. For example, an audit can be performed to compare one or more invoice fields against one or more manifest fields. In some embodiments, if the audit is passed, an invoice may be automatically approved for payment, a notification may be sent to an entity (e.g., an auditing company), or both. For example, if the contract terms of the invoice and the contract terms of the manifest as inputted into the shipment record are consistent, the audit may be passed, and the invoice can be automatically approved for payment.

In some embodiments, the audit can be passed if two compared pieces of data are substantially consistent. The two pieces of data can be substantially consistent if the two pieces of data are within a tolerance range of one another. For example, if the contract terms of the invoice and the contract terms of the manifest are substantially consistent, the invoice can be automatically approved for payment. In some embodiments, the tolerance range can be configured to the individual relationship. For example, an acceptable tolerance range may be a final cost that differs by less than $1.00. In some embodiments, the tolerance range may be used to account for a business reality of carrier inconsistency and imprecision. Upon passing the audit, a message or notification can be sent to an entity (e.g., the company or payment company) authorizing the payment of the invoice.

In some embodiments, if the audit is failed, an invoice may not automatically be approved for payment. For example, if the contract terms of the invoice and the contract terms of the manifest do not match, the invoice may not be automatically approved for payment. In some embodiments, the discrepancies can be assigned status codes and different notations and/or assigned to work queues (e.g., for the auditing entity) that represent the invoices that are not yet approved. In some embodiments, the shipment record can be added to a discrepancy list or other grouping that requires additional attention. An auditing entity can review the shipment record to determine the source of the discrepancy. In some embodiments, the discrepancy can be a minor discrepancy. In the event that the discrepancy is minor, the audit entity may modify the shipment record and approve the payment of the invoice.

An exemplary embodiment illustrating a situation where the auditing entity may modify the shipment record to resolve a discrepancy can include the following: all other terms being consistent, the origination point of the bill of lading on the invoice is identified as port X and the origination point of the bill of lading on the manifest is identified as port Y. Under the original overriding contractual agreement between the parties, port Y was the only acceptable port listed. For business reasons and after the contractual agreement was negotiated, port X may have been created and may be located in physical proximity to both port Y and manufacturing facility. No other reason would exist to prevent Port X from being an acceptable origination location other than it not being contemplated at the time of the contract. Assuming all other terms are consistent, e.g. cost, container identification, SKUs, POs, the discrepancy of an origination point may be overridden by the auditing entity to authorize payment of the invoice.

In some embodiments, the audit of the record can comprise analyzing the data within the audit in view of a third source of data. The third source of data may comprise one or more previously audited invoices, separate shipping records, or other documents. For example, the record may comprise a container identification number and container size information as submitted on an invoice. During the audit of the record, the container identification number and container size information can be analyzed and compared to other previously audited invoices by a carrier or shipment records (e.g., that are stored within a storage medium). In some embodiments, if the same container identification number and/or container size information appears within two different invoices, the auditing process can flag the record as a discrepancy. In such a case, the invoice may be a duplicate bill. Thus, some embodiments can prevent the authorization of duplicate payment for the same shipment. Other variations of auditing and validating the contents of the cargo are contemplated within the scope of the present disclosure.

In some embodiments, where the discrepancy is not a minor discrepancy, the auditing process can flag the shipment record or generate an audit failure notification, e.g., to draw the invoice to the entities' attention. In some embodiments, the audit failure notification may comprise an automatically generated discrepancy report list. In some embodiments, the discrepancy report list can be generated daily. In some embodiments, the notification can be sent to the particular entities. An entity can log into the web portal via a user name and password to access the web portal system, e.g., to review the flagged shipment record.

For example, if an error exists on the amount of charges listed on the invoice, the auditing process can notify the carrier of the discrepancy. If the carrier agrees with the error in the discrepancy, the carrier can submit a replacement invoice to correct the discrepancy. The shipment record can be updated with information contained within the replacement invoice. If the new shipment record contains consistent terms, the invoice can be automatically authorized for payment. Some embodiments can prevent the payment of an incorrect invoice because the payment entity has not been authorized to pay the invoice.

In some embodiments, an invoice can be tagged as either a new document or a resubmitted invoice. The invoice can be audited. In some embodiments, if the invoice passes the audit, a message can be sent to a payment entity, e.g., authorizing the payment of the invoice. If the invoice fails the audit, a discrepancy report can be generated. In some embodiments, the discrepancy report may comprise a list of shipment records that have failed an audit with the type of discrepancy noted. In some embodiments, upon review of a discrepancy, the carrier can create a replacement document (e.g., a replacement invoice or bill of lading) or update a data field in the shipment record, e.g., to resolve the discrepancy. In some embodiments, the replacement document and/or updated shipment record can undergo another audit. If the replacement document and/or data field update resolves the discrepancy, the shipment record will pass the audit. Otherwise, a new discrepancy report can be generated that includes updated discrepancy information.

In the above example, if the carrier does not agree with the discrepancy in the invoice and believes that no error has been made, the carrier can initiate a dispute process (e.g., with the company, logistics entity, and/or payment entity). Such a dispute process can arise prior to the payment of the invoice, which may reduce the likelihood of an invoice being improperly paid.

In some embodiments, the shipment record can only be modified by the auditing entity. In other embodiments, the shipment record can be modified by a carrier. For example, the carrier may be able to log in to a web portal and modify the size of container used in the shipment and included in the shipment record.

Referring now to FIG. 1, FIG. 1 shows an embodiment of a system for generating and analyzing shipping parameters. An auditing entity 14 may receive a first data source 16 from a first entity 11, a second data source 17 from a second entity 12, and third data source 18 from a third entity 13. In some embodiments, the first data source 16 can comprise a manifest. In some embodiments, the second data source 17 can comprise an invoice. In some embodiments, the first entity 11 can be a third party logistics company that is assigned to deal directly with factories, take bookings and reservations, access availability for shipments, make reservations with carriers, and/or coordinate processes associated with shipping. The second entity 12 can be a carrier that can transport the freight from the logistics company to the company.

In some embodiments, a shipment record can be created by the auditing entity 14. The shipment record may include at least a portion of the information in the manifest (first data source 16), at least a portion of the information in the invoice (second data source 17), or both. In some embodiments, the auditing entity 14 can conduct the audit of the shipment record.

The auditing entity can comprise a system including a processor configured to import the manifest data and create a shipment record awaiting a corresponding invoice. Purchase Orders (PO) and stock keeping unit (SKU) information can be validated by the auditing entity. In some embodiments, the auditing entity can comprise a system including a processor configured to import invoice data and match the invoice data with the corresponding manifest data. In some embodiments, container numbers can be validated by the auditing entity. The methods of auditing described herein can generate messages to notify the carriers and other entities of the status of each invoice. In some embodiments, if the manifest and invoice contain consistent and/or substantially consistent terms (within a defined tolerance limit), the auditing process can approve the payment of the invoice. A message can be sent to the payment entity 15 authorizing the payment of the correct invoice.

Figure 2:
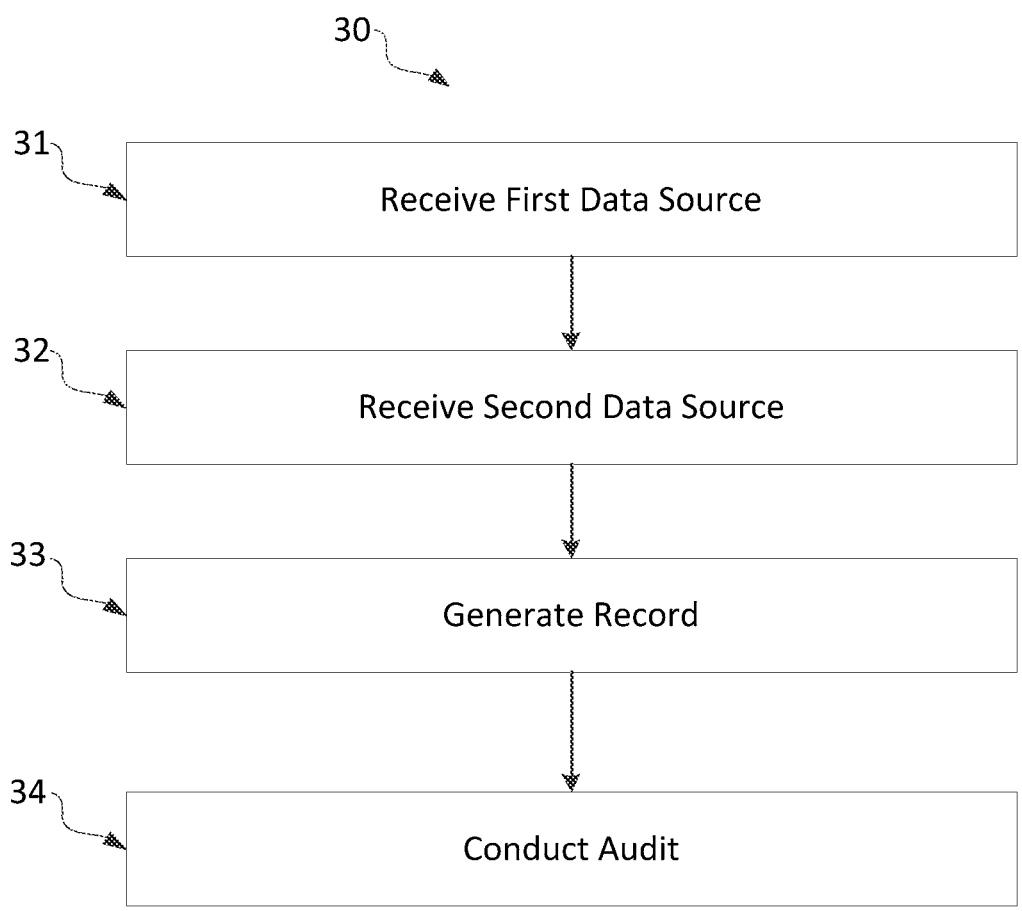
FIG. 2 shows a flowchart of steps for performing a method for generating and analyzing shipping parameters according to one embodiment.

FIG. 2 shows a flowchart of steps for performing a method 30 for generating and analyzing shipping parameters according to one embodiment. In such an embodiment, the method 30 comprises receiving a first data source 31 and receiving a second data source 32. In some embodiments, the first data source comprises a manifest. In some embodiments, the second data source comprises an invoice.

The method 30 further comprises generating a record 33. The record 33 can be generated from at least a portion of data of the first data source and at least a portion of data of the second data source. In some embodiments, the record 33 can include a shipping matrix (e.g., a matrix of shipping parameters). Each row of the shipping matrix may comprise parameters associated with a particular shipping route. In some embodiments, each row of the shipping matrix can include a shipper, consignee, carrier, bill of lading origin, bill of lading destination, port of loading, port of discharge, effective date, expiration date, or any combination of these. In some embodiments, the shipping matrix can be determined based on data from the first data source, at least one user preference, and/or at least one contract term.

The method 30 further comprises conducting an audit 34 of the record. In some embodiments, conducting the audit 34 and/or generating the record 33 may comprise determining a shipping rate (e.g., cost) associated a row of the shipping matrix. For example, conducting the audit 34 may comprise determining a shipping rate for a shipping route associated with the row of the shipping matrix. In some embodiments, conducting the audit 34 may comprise comparing the determined shipping rate to a shipping rate provided by an entity (e.g., a shipping rate provided in an invoice by a shipper, carrier, or consignee). In some embodiments, an entity can be notified if there is a difference between a determined shipping rate and the shipping rate provided by the entity and/or the difference exceeds a threshold.

Figure 3:
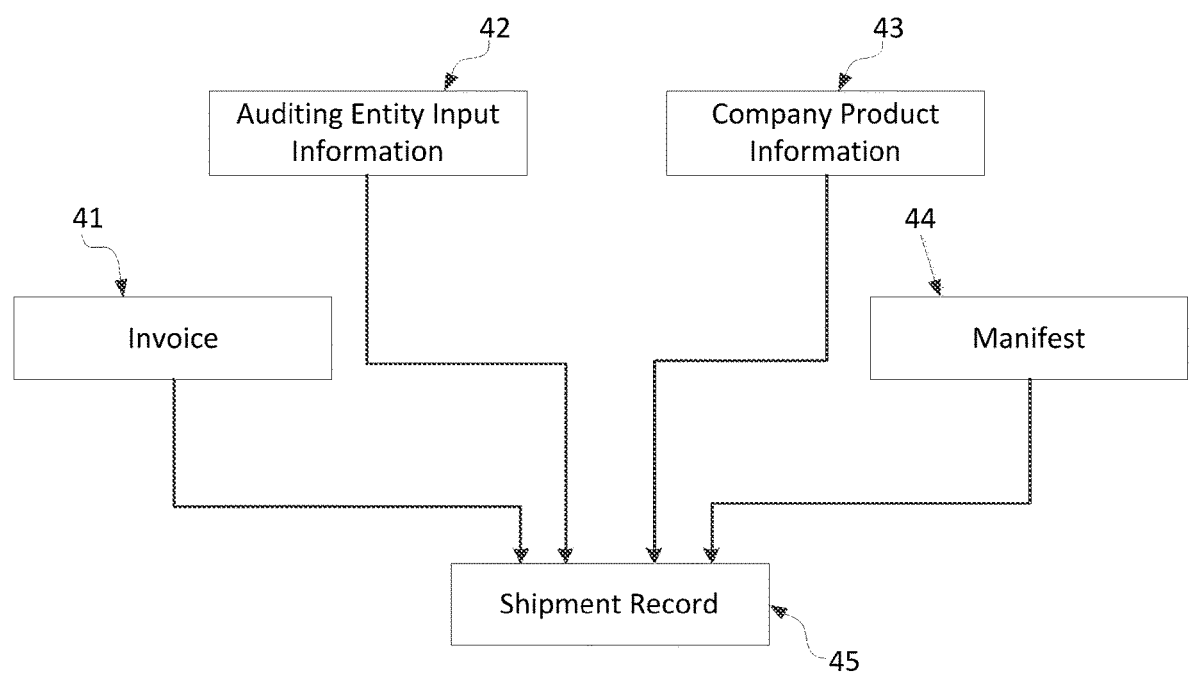
FIG. 3 shows an embodiment of a system comprising an exemplary plurality of sources for generating a record.

FIG. 3 shows an embodiment of a system comprising an exemplary plurality of sources for generating a record. A shipment record 45 can generated from a plurality of data sources. The plurality of data sources can comprise an invoice 41, auditing entity input information 42, company product and contract information 43, and a manifest 44. FIG. 3 depicts the shipment record 45 as a central repository storing data from the plurality of sources.

Figure 4:
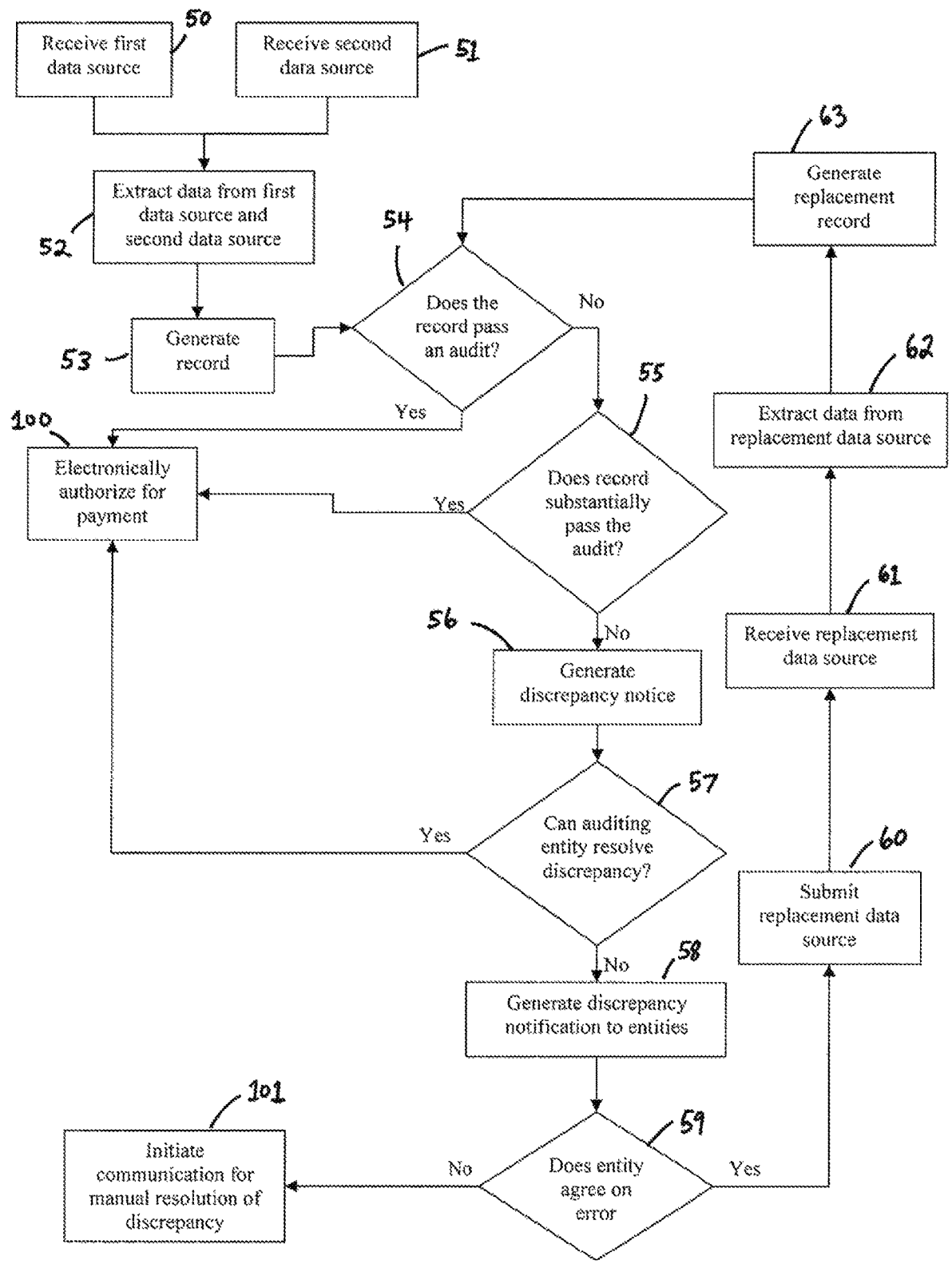
FIG. 4 shows a flowchart of steps for performing a method for generating and analyzing shipping parameters according to an embodiment.

FIG. 4 shows a flowchart of steps for performing a method for generating and analyzing shipping parameters according to an embodiment. The method can comprise receiving a first data source 50 and a second data source 51. A system or processor, as described above, can extract at least a portion of data from the first data source and the second data source 52. Next, a record can be generated comprising at least a portion of data from the first data source and/or the second data source 53. The record can then be audited 54. The audit comprises analyzing the record to determine whether any discrepancies exist within the record. If the record passes the audit, payment of an invoice can be electronically authorized 100.

In some embodiments, if the record does not pass the audit, the record can be further analyzed to determine whether the record substantially passes the audit 55. For example, as described above, if the discrepancy falls within a defined tolerance, then the record may pass the audit. If so, payment of an invoice can be electronically authorized 100. If the record does not substantially pass the audit, a discrepancy notification can be generated 56. In some embodiments, the discrepancy notification can be first reviewed by the auditing entity. If the auditing entity can resolve the discrepancy, then payment of an invoice can be electronically authorized 100. If the auditing entity cannot resolve the discrepancy, a discrepancy notification to the entities involved in the transaction can be generated 58.

In some embodiments, the discrepancy notification to the entities can comprise identifying the source of the discrepancy. If one of the entities reviews the notification and recognizes an error on its part, the entity can submit its respective data to resolve the issue by submitting a replacement data source 60. If the entities disagree on the source of the discrepancy, in some embodiments, manual communication between the parties can be initiated to resolve any discrepancy 101.

Upon submitting the replacement data source 60, the auditing entity receives the replacement data source 61. The system or processor, as described above, can extract at least a portion of data from the replacement data source 62. In some embodiments, a replacement record can be generated comprising at least a portion of data from the replacement data source 63. In some embodiments, the replacement record can then be audited 54. The audit may comprise analyzing the record to determine whether any discrepancies exist within the record. In some embodiments, if the record passes the audit, payment of an invoice can be electronically authorized 100. If not, the process continues as described above.

Figure 5:
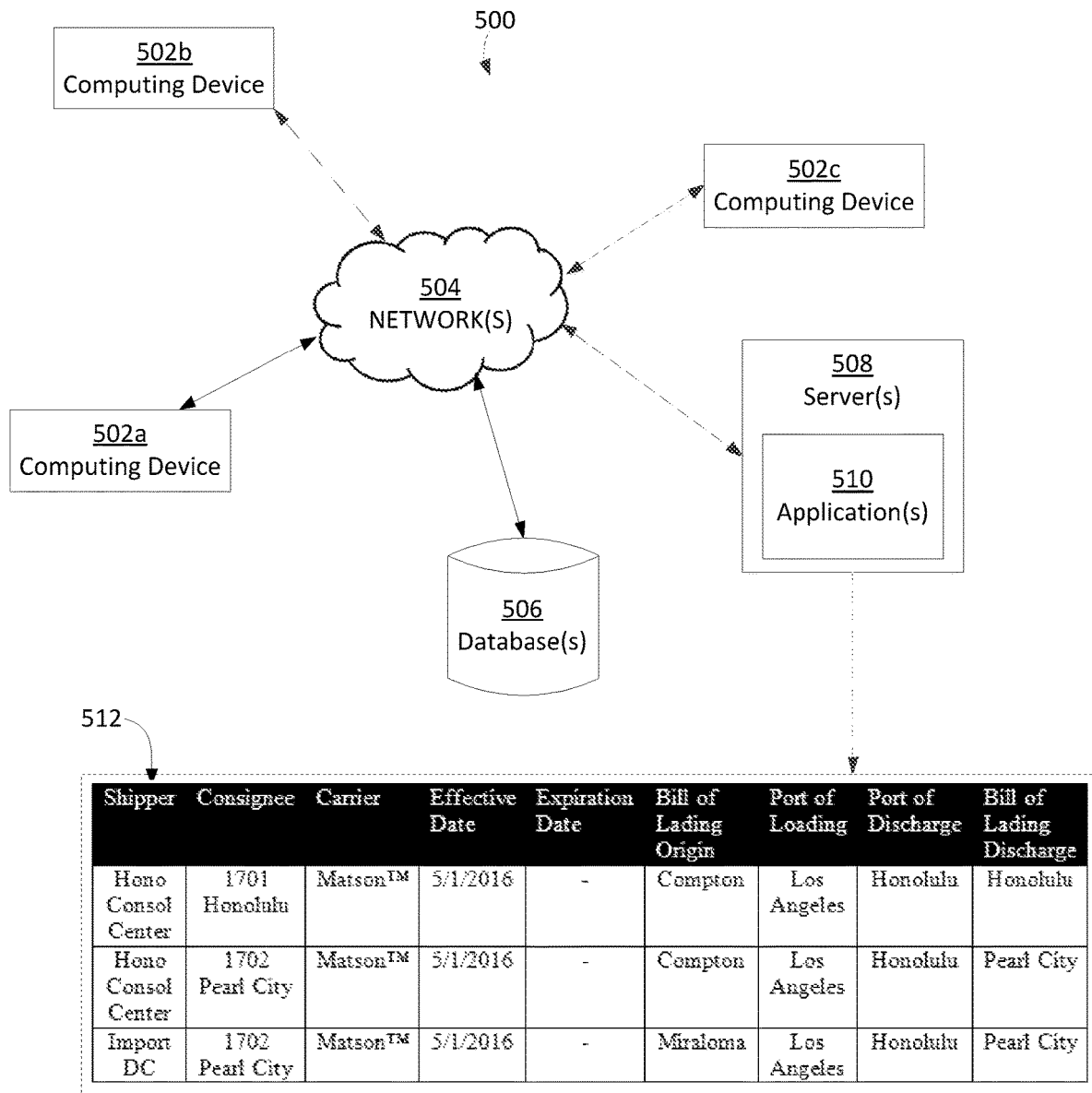
FIG. 5 shows an embodiment of a system for electronically generating and analyzing shipping parameters.

FIG. 5 shows an embodiment of a system 500 for electronically generating and analyzing shipping parameters. Any embodiment or combination of embodiments described herein may be implemented using any component (e.g., computing device 502 or server 508) or combination of components (e.g., computing device 502a-b, server 508, and database 506) shown in FIG. 5.

The system 500 may comprise one or more computing devices 502a-c. In some embodiments, the computing devices 502a-c may comprise a mobile device (e.g., smart phone), a laptop computer, a desktop computer, a server, and/or any other computing device. The computing devices 502a-c may be associated with one or more entities. For example, in one embodiment, the computing device 502a may be associated with a shipping company used to transport goods. Computing device 502b may be associated with a carrier and/or consignee of the goods. Computing device 502c may be associated with a provider or supplier of the goods. The system 500 may comprise any number, arrangement, and configuration of computing devices 502 associated with any number, arrangement, and configuration of entities. An example of a computing device 502a-c (or server 508) is described with respect to FIG. 6.

The system 500 may comprise one or more servers 508. The server(s) 508 may comprise a mobile device (e.g., smart phone), a laptop computer, a desktop computer, and/or any other computing device. In some embodiments, the server(s) 508 may comprise a cloud server (e.g., cloud server 708 of FIG. 7), a webserver, etc. For example, the server(s) 508 may comprise a cloud server configured to execute one or more applications 510 (e.g., cloud applications) for performing any of the methods described herein. In some embodiments, one or more entities may use one or more computing devices 502*a*-*c* to execute the application(s) 510 via server(s) 508. The application(s) 510 may be for analyzing and/or generating shipping parameters.

In some embodiments, the server(s) 508 can receive data (e.g., via network 504) from one or more computing devices 502*a*-*c*, execute the application(s) 510, and/or provide results from the application(s) 510 to one or more computing devices 502*a*-*c*. In some embodiments, execution of the application(s) 510 and/or processing can be distributed or split among multiple processors or servers 508. For example, two or more servers 508 may execute portions of a single application 510 in parallel. As another example, two or more servers 508 may execute the same application or different applications 510 in parallel. This may enhance the speed and/or accuracy of the system 500.

In some embodiments, one or more server(s) 508 are configured receive one or more data sets from any combination of the computing devices 502*a*-*c* and database(s) 506. For example, the server(s) 508 may receive a first data set from computing device 502*a*, a second data set from a database 506, a third data set from computing device 502*b*, and/or a fourth data set from a computing device 502*c*. In some embodiments, the one or more server(s) 508 are configured to generate a shipping matrix 512 based at least in part on the first data set, second data set, third data set, and/or fourth data set.

In some embodiments, the server 508 is configured to analyze the shipping matrix 512 and provide a notification (e.g., to one of the computing devices 502*a*-*c*) indicating a result of the analysis. For example, the server 508 may determine a shipping rate (e.g., shipping cost) corresponding to a row of information in the shipping matrix 512. The server 508 may compare the determined shipping rate to another shipping rate from an invoice to determine if there is a discrepancy between the two. The server 508 can provide a notification to a computing device 502*a*-*c*, e.g., indicating a result of analysis. For example, in some embodiments, the server 508 may transmit an electronic communication via the network 504 configured to cause a computing device 502*a*-*c* to indicate, via a graphical user interface (GUI) output by a display, the result of the analysis. In such an embodiment, the server 508 may transmit an electronic communication configured to cause the computing device 502*a* to output, e.g., via a display, an indication of whether a determined shipping rate is within a predefined tolerance range of the shipping rate from the invoice.

In some embodiments, the server 508 and/or the computing devices 502*a*-*c* may be configured to output data via a customizable and/or customized GUI. For example, the server 508 and/or the computing devices 502*a*-*c* may be configured to output an indication of whether a determined shipping rate is within a predefined tolerance range of the shipping rate from the invoice via a customized GUI. In some embodiments, a user may be able to configure or otherwise customize how the GUI is displayed, the features of the GUI, how the GUI displays the indication, or any combination of these. For example, the user may provide input, via an input device such as a keyboard or mouse, to the server 508 and/or computing device 502*a*-*c*. The input may indicate a selection between colors, fonts, text styles, images, and/or other user preferences to customize the GUI. Based on the input, the server 508 and/or the computing devices 502*a*-*c* may update the features of the GUI to reflect the user preferences.

The system may comprise one or more databases 506. In some embodiments, one or more computing devices 502*a*-*c* and/or servers 508 can query the database(s) 506 to obtain data (e.g., for use in electronically generating and/or analyzing shipping parameters). For example, the database 506 may store a first data set provided by, e.g., the computing device 502*a*. The first data set may comprise data from a manifest. The database 506 may additionally or alternatively store a second data set provided by, e.g., the computing device 502*b*. The second data set comprise user preferences. The database 506 may additionally or alternatively store a third data set provided by, e.g., the computing device 502*c*. The third data set may comprise one or more contract terms. In some embodiments, one or more computing devices 502*a*-*c* and/or servers 508 may use data stored in the database(s) 506, e.g., to generate a shipping matrix 512 and/or analyze the shipping matrix 512.

The computing devices 502*a*-*c*, server(s) 508, and/or database(s) 506 may be connected to, and communicate via, a network 504. The network 504 may be any suitable number or type of networks or links, including, but not limited to, a dial-up network, a local area network (LAN), wide area network (WAN), public switched telephone network (PSTN), a cellular network, a WiFi network, the Internet, an intranet or any combination of hard-wired and/or wireless communication links. In some embodiments, the network 504 is a single network. In other embodiments, the network 504 may comprise two or more networks.

Any configuration of components shown in FIG. 5 is possible. For example, in some embodiments, the computing device 502*a* may comprise a server 508, or the server 508 may comprise the computing device 502*a*. As another example, the server(s) 508 may comprise one or more database(s) 506. As still another example, the system 500 may not comprise the server(s) 508 and/or the database(s) 506.

As discussed above, in some embodiments, the computing devices 502*a*-*c* comprise mobile devices. This may allow entities to log in to the server 508 and/or perform one or more tasks for electronically generating and analyzing shipping parameters from anywhere in the world.

In some embodiments, the computing devices 502*a*-*c* transmit information associated with one or more locations of the computing devices 502*a*-*c* (e.g., as detected via a GPS device) to the server 508. For example, a computing device 502*a* may comprise a GPS unit. The computing device 502*a* may receive sensor signals from the GPS unit associated with a location of the computing device 502*a*. The computing device 502*a* may determine the location of the computing device 502*a* based on the sensor signals. In some embodiments, the computing device 502*a* transmits data associated with the location to the server 508. In some embodiments, the server 508 can use the location to generate at least a portion of the shipping matrix 512 and/or determine a shipping cost. For example, a computing device 502*a* may be associated with a shipping entity and positioned on a vehicle for transporting goods. The computing device 502*a* may transmit GPS data to the server 508 associated with the location of the vehicle, e.g., as the vehicle drives across the country. The server 508 may receive the GPS data and update or otherwise determine a shipping cost for a particular shipping route based on the location of the vehicle.

Figure 6:
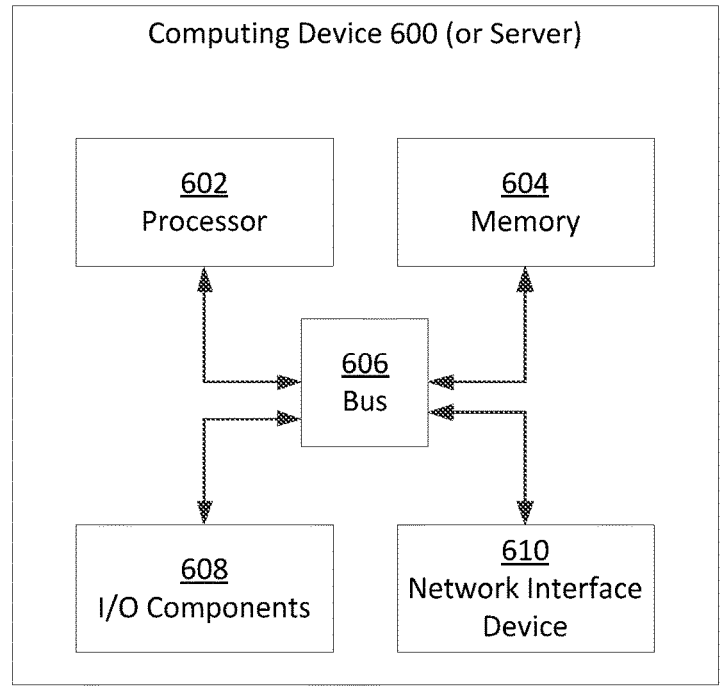
FIG. 6 is a block diagram showing an embodiment of a computing device for electronically generating and analyzing shipping parameters.

FIG. 6 is a block diagram showing an embodiment of a computing device 600 (or a server) for electronically generating and analyzing shipping parameters. The computing device 600 may comprise a processor 602, a memory 604, a bus 606, input/output components 608, and/or a network interface device 610. In some embodiments, the components (e.g., the processor 602, memory 604, input/output components 608, and network interface device 610) of the computing device 600 may be integrated into a single housing. In other embodiments, the components may be distributed (e.g., among multiple housings or locations) and in electrical communication with one another. The computing device 600 may or may not comprise all of the components shown in FIG. 6.

The processor 602 can execute one or more operations for performing any of the methods described herein. The processor 602 can include one processing device or multiple processing devices. In some embodiments, the processor 602 may comprise a Field-Programmable Gate Array ("FPGA"), an application-specific integrated circuit ("ASIC"), a microprocessor, etc.

The processor 602 can be communicatively coupled to the memory 604 via the bus 606. In some embodiments, the processor 602 can execute instructions stored in the memory 604 to perform one or more operations. For example, the memory 604 may store instructions for one or more applications (e.g., such as a cloud-based application described in greater detail below). The processor 602 can execute the instructions to perform one or more operations associated with the one or more applications.

The memory 604 may comprise non-volatile memory that can retain stored information when powered off. In some embodiments, the memory 604 may comprise electrically erasable and programmable read-only memory ("EEPROM"), flash memory, or any other type of non-volatile memory. In some embodiments, at least some of the memory 604 can include a computer-medium from which the processor 602 can read instructions. The computer-readable medium can include electronic, optical, magnetic, or other storage devices capable of providing the processor 602 with instructions or other program code. The computer-readable medium can include instructions which when executed by the processor 602 are configured for causing the processor 602 to perform any of the embodiments (e.g., methods) described herein. In some embodiments, the computer-readable medium may comprise magnetic disk(s), memory chip(s), ROM, random-access memory ("RAM"), an ASIC, a configured processor, optical storage, and/or any other medium from which a computer processor can read instructions. The instructions may comprise processor-specific instructions generated by a compiler or an interpreter from code written in any suitable computer-programming language, including, for example, C, C++, C #, Java, etc.

In some embodiments, network interface device 610 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some embodiments, I/O components 608 may be used to facilitate connection to devices such as one or more displays (e.g., touch-screen displays), touch sensitive surfaces, keyboards, mice, and/or other hardware used to input data or output data.

Figure 7:
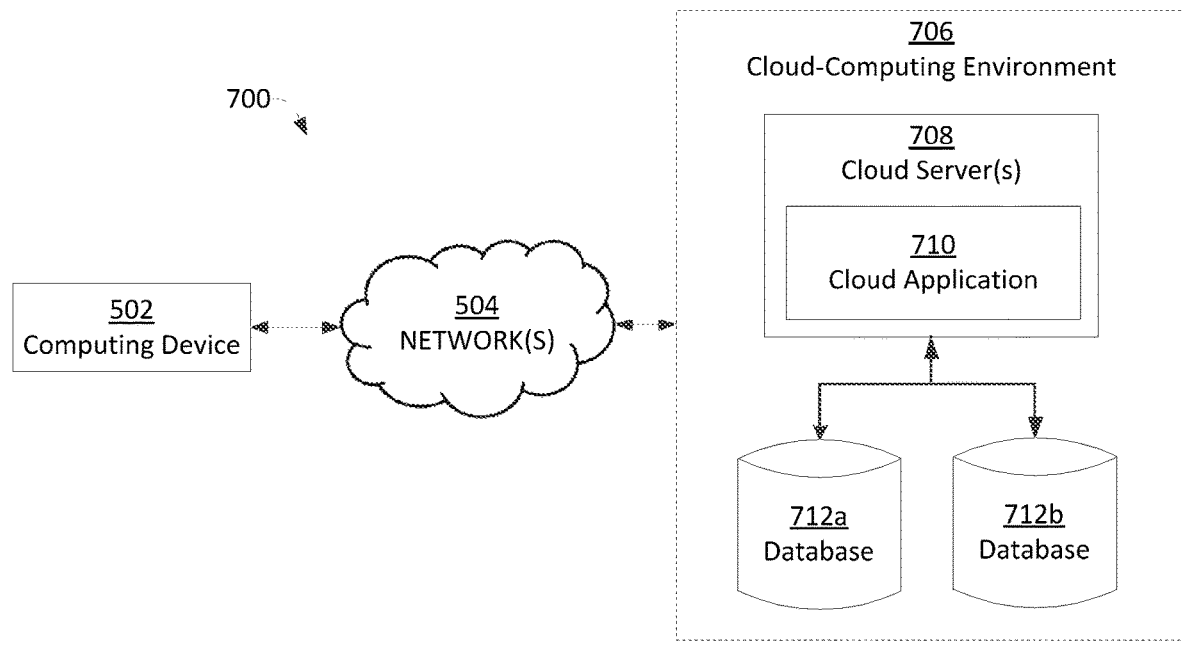
FIG. 7 is a block diagram showing another embodiment of a system for electronically generating and analyzing shipping parameters.

FIG. 7 is a block diagram showing another embodiment of a system 700 for electronically generating and analyzing shipping parameters. The system 700 comprises a cloud-computing environment 706. One or more computing devices 502 (e.g., a client computing device) may be in communication with the cloud-computing environment 706 via one or more network(s) 504.

The cloud-computing environment 706 may enable convenient access to a shared pool of configurable hardware and/or software computing resources. The computing resources can be easily and centrally developed, installed, updated, secured, and/or otherwise maintained by a provider of the cloud-computing environment 706. For example, in some embodiments, the cloud-computing environment 706 may be configured to provide virtual computing resources to a computing device 502, such as software, storage space, processing power, and/or network access. The computing device 502 may remotely access the cloud-computing environment 706 to "borrow" computing resources for performing various computing tasks. In some embodiments, the cloud-computing environment 706 can be less expensive and time consuming for shipping entities to use. For example, the cloud-computing environment 706 may reduce or eliminate the need for shipping entities to individually purchase expensive hardware and software; stay up-to-date with security, software, and hardware updates; and/or hire or train technology personnel (e.g., information technology personnel). Further, such cloud-computing environments 706 may use sophisticated hardware or software that the shipping entities may not otherwise have access to (e.g., fiber optic cable lines or other high-speed connections, top-of-the-line hardware and servers, etc.). This may improve processing speeds and network response times, among other functionality, for the shipping entities.

In some embodiments, the cloud-computing environment 706 can include various hardware and software components, such as routers, switches, firewalls, servers, computing devices, and/or databases. For example, some embodiments may comprise one or more cloud servers 708 configured to execute one or more cloud application(s) 710. In some embodiments, the cloud-computing environment 706 may comprise a plurality of cloud server(s) 708 configured to distribute processing and/or computing tasks among one another, e.g., for executing one or more cloud applications 710. The cloud-computing environment 706 may comprise any number of cloud servers 708, databases 712, and/or other hardware and software components.

In some embodiments, one or more cloud server(s) 708 are programmed (e.g., specifically programmed) or otherwise configured for use in the cloud-computing environment 706. For example, a cloud server 708 may be loaded with specific hardware or software components for enabling distributed processing, virtual sharing of computing resources, execution of one or more cloud applications 710, communication with the computing device 502, and/or other cloud features. In some embodiments, the cloud server 708 may be specifically programmed to apportion processing power and/or memory among a plurality of concurrently executing cloud applications 710 based on various parameters, such as bandwidth, a number of connected computing devices 502, one or more characteristics of the cloud applications 710, or any combination of these.

In some embodiments, the cloud-computing environment 706 can make electronically generating and analyzing shipping parameters easier, faster, and more convenient. For example, the cloud-computing environment 706 may act as a shared resource through which one or more shipping entities generate and analyze shipping parameters, e.g., from anywhere in the world. For instance, one or more shipping entities may be able to remotely login to the cloud-computing environment 706 via a computing device 502 and execute one or more commands configured to cause the cloud-computing environment 706 to execute a cloud application 710. The cloud application 710 may generate a shipping matrix and/or analyze a shipping cost based on the commands. In some embodiments, the cloud-computing environment 706 can distribute the processing for generating the shipping matrix and/or analyzing a shipping cost among a plurality of processors. This may provide a faster and more convenient analysis of the shipping cost.

Figure 8:
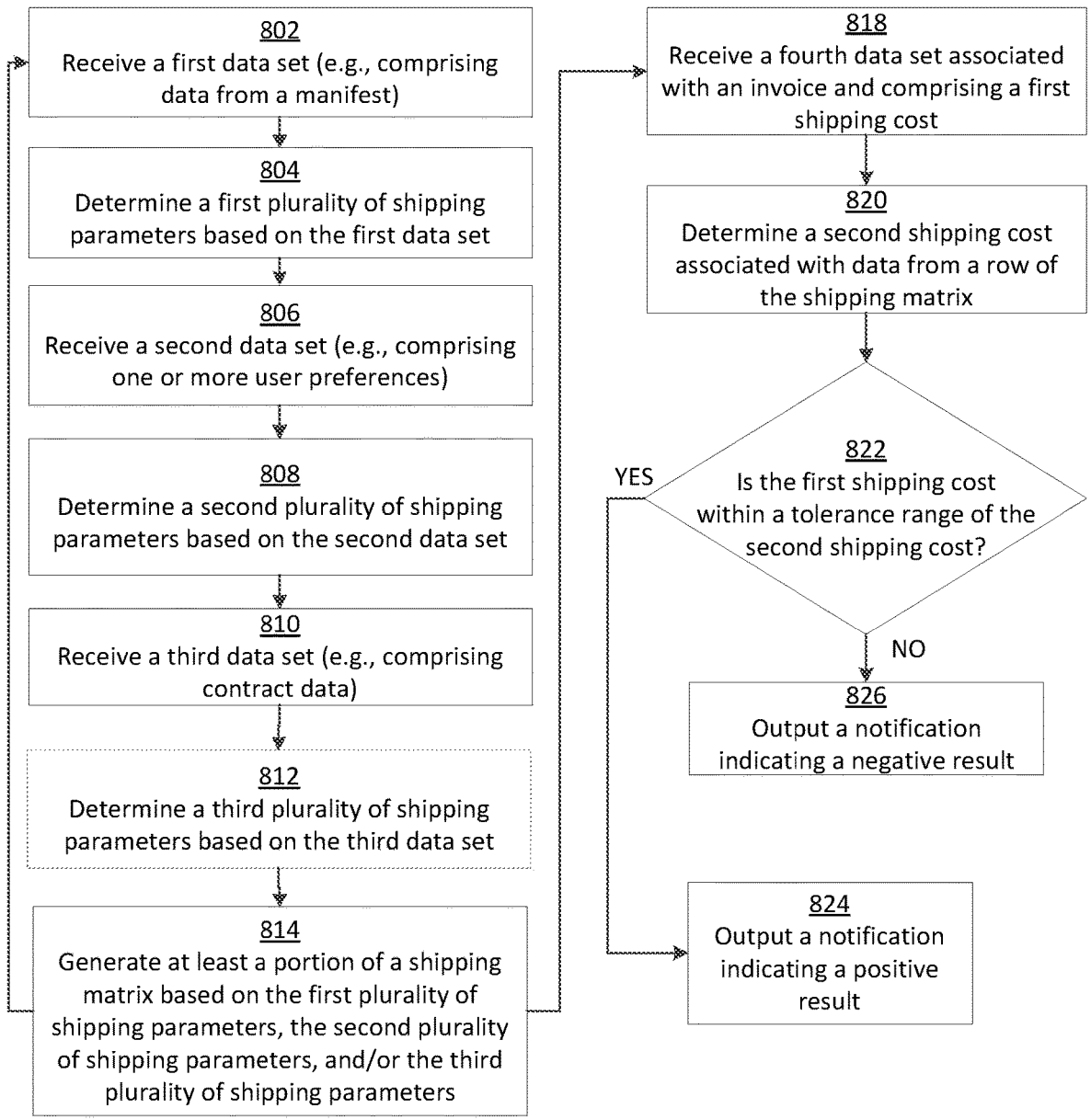
FIG. 8 is a flow chart of steps for performing a method for electronically generating and analyzing shipping parameters according to an embodiment.

FIG. 8 is a flow chart of steps for performing a method for electronically generating and analyzing shipping parameters according to an embodiment. In some embodiments, the steps in FIG. 8 may be implemented in program code that is executed by a processor, for example, the processor in a general purpose computer, a mobile device, or a server. In some embodiments, these steps may be implemented by a group of processors. In some embodiments, one or more steps shown in FIG. 8 may be omitted or performed in a different order. Similarly, in some embodiments, additional steps not shown in FIG. 8 may also be performed. For example, any of the steps shown in FIG. 4 may also be performed. In some embodiments, one or more of the steps shown in FIG. 4 may be sub-steps within one of the steps shown in FIG. 8. Further, for simplicity, the steps below are described with reference to components described above with regard to the computing device 600 shown in FIG. 6. But it should be understood that any electronic device described herein may be used to implement the steps below.

The method begins at step 802 when a processor 602 receives a first data set. The processor 602 may receive the first data set from a remote computing device, server, database, a local memory 604, or any combination of these. The first data set may comprise data from a manifest, such as a shipping manifest. In some embodiments, the processor 602 determines data from the first data set for use in analyzing or generating one or more shipping parameters. For example, the processor 602 may extract shipper information (e.g., a name of a shipping company, or a shipping location), consignee information (e.g., a name of a consignee for the goods), carrier information (e.g., a name of a carrier for the goods), an amount of the goods being shipped (e.g., by weight, units, volume, or other metric), a type of the goods being shipped, a number of containers holding the goods being shipped, and/or other information from the first data set.

In one embodiment, the processor 602 receives a first data set from a shipping company and associated with the transport of computer components. The first data set may comprise information indicating that, for example, a shipper of the computer components is Hono Consol Center, a consignee for the computer components is 1701 Honolulu, and a carrier of the goods is Matson™.

The method continues at step 804 when the processor 602 determines a first plurality of shipping parameters based on the first data set. For example, the processor 602 may extract shipper information, consignee information, carrier information, an amount of goods being shipped, a type of the goods being shipped, and/or other information from the first data set. In some embodiments, the processor 602 can use this extracted data as the first plurality of shipping parameters. For example, the processor 602 can use the shipper information, consignee information, carrier information, and/or other information as the first plurality of shipping parameters. For instance, in the embodiment described above relating to the transport of computer components, the processor 602 can use Hono Consol Center, 1701 Honolulu, and Matson™ as the first plurality of shipping parameters.

The method continues at step 806 when the processor 602 receives a second data set. The processor 602 may receive the second data set from a remote computing device, server, database, a local memory 604, or any combination of these. In some embodiments, the second data set comprises one or more user preferences. In some embodiments, a user preference may comprise a particular shipping route associated with a particular shipper of goods. For example, the user may input that the user prefers to ship goods via Route A (e.g., from Chicago, to Los Angeles, to Hong Kong) for Carrier A (e.g., Matson™). The user may input that the user prefers to ship goods via Route B (e.g., from Seattle directly to Hong Kong) for Carrier B (e.g., American President Lines Ltd.™).

In some embodiments, a user preference comprises an expiration date (e.g., for a particular user preference). For example, the user may only wish to use different shipping routes (e.g., Route A and Route B) for different carriers (e.g., Carrier A and Carrier B) until a particular date, such as May 31. Thus, in some embodiments, the user may set an expiration date, after which the user's shipping route preferences may return to a default state or otherwise change.

For example, in the embodiment described above relating to the transport of computer components, the processor 602 can receive a second data set comprising a user preference. The user preference can indicate that the user prefers to use a shipping route from Compton, to Los Angeles, to Honolulu when the carrier is Carrier A and for shipments between October 1 and November 1.

The method continues at step 808 when the processor 602 determines a second plurality of shipping parameters based on the second data set (and/or the first data set). For example, in some embodiments, the processor 602 determines the second plurality of shipping parameters by mapping one or more of the first plurality of shipping parameters to one or more of the second plurality of shipping parameters using a database or lookup table. In such an embodiment, the processor 602 can use data from the second data set as a constraint while performing the mapping. For example, based on a user preference (e.g., indicating a preferred shipping route), the processor 602 may access a lookup table and map a particular shipper, consignee, and/or carrier to a particular bill of lading origin, a particular port of loading, a particular port of discharge, and/or a particular bill of lading discharge location. The processor 602 can use the particular bill of lading origin, particular port of loading, particular port of discharge, and/or particular bill of lading discharge location as the second plurality of shipping parameters.

As a particular example, the processor 602 may use a user preference as a constraint while using a lookup table to map a particular shipper (e.g., Hono Consol Center) to a particular bill of lading origin (e.g., Compton), a particular port of loading (e.g., Los Angeles), a particular port of discharge (Honolulu), a particular bill of lading discharge location (e.g., Honolulu), or any combination of these. As another example, the processor 602 may use a user preference as a constraint while using a lookup table to map a particular consignee (e.g., 1701 Honolulu) and/or carrier (e.g., Matson™) to a particular bill of lading origin (e.g., Compton), a particular port of loading (e.g., Los Angeles), a particular port of discharge (Honolulu), a particular bill of lading discharge location (e.g., Honolulu), or any combination of these.

As still another example, in the embodiment described above relating to the transport of computer components, the processor 602 can use a user preference comprising a preferred shipping route for the carrier Matson™ as a constraint while using a lookup table to determine a bill of lading origin of Compton, a port of loading of Lost Angeles, a port of discharge of port of Honolulu, and a bill of lading discharge location of Honolulu.

The method continues at step 810 when the processor 602 receives a third data set. The processor 602 may receive the third data set from a remote computing device, server, database, a local memory 604, or any combination of these. In some embodiments, the third data set comprises contract data. In some embodiments, the contract data comprises one or more shipping routes, consignees, weight restrictions or requirements, costs, timeframes, and/or other information associated with a contractual relationship between two entities. For example, the contract data may be associated with a shipping rate agreement and/or a service provider agreement between two entities.

For example, in the embodiment described above relating to the transport of computer components, the processor 602 can receive a third data set comprising contract data indicating an effective date of a contract is May 1, 2016 and/or an expiration date of the contract is May 1, 2017.

The method continues at step 812 when the processor 602 determines a third plurality of shipping parameters based on the third data set. For example, the processor 602 may extract contract data from the third data set. In some embodiments, the processor 602 can use this extracted data as the third plurality of shipping parameters.

For example, in the embodiment described above relating to the transport of computer components, the processor 602 can determine a third plurality of shipping parameters comprising an effective date for a contract of May 1, 2016, and that there is no expiration date for the contract.

The method continues at step 814 when the processor 602 generates a shipping matrix based on the first plurality of shipping parameters, the second plurality of shipping parameters, and/or the third plurality of shipping parameters (e.g., shipping matrix 512 of FIG. 5). In some embodiments, the shipping matrix comprises one or more shipping routes. For example, each row in the shipping matrix can represent a particular shipping route. In some embodiments, the shipping matrix can be 400 or more rows long.

In some embodiments, the processor 602 can generate the shipping matrix (e.g., at least a portion of a particular row of the shipping matrix) at least in part by including the first plurality of shipping parameters in the shipping matrix. For example, the processor 602 can include a shipping company identifier, a consignee identifier, and/or a carrier identification (e.g., associated with the first plurality of shipping parameters) in the shipping matrix.

In some embodiments, the processor 602 can generate the shipping matrix (e.g., at least a portion of a particular row of the shipping matrix) at least in part by including the second plurality of shipping parameters in the shipping matrix. For example, the processor 602 can include a bill of lading origin, a bill of lading destination, a port of loading, and/or a port of discharge (e.g., associated with the second plurality of parameters) in the shipping matrix.

In some embodiments, the processor 602 can generate the shipping matrix (e.g., at least a portion of a particular row of the shipping matrix) at least in part by including the third plurality of shipping parameters in the shipping matrix. For example, the processor 602 can include an effective date for a contract or an expiration date for the contract (e.g., associated with the third plurality of parameters) in the shipping matrix.

As a particular example, in the embodiment described above relating to the transport of computer components, the processor 602 can generate a row of the shipping matrix that comprises Hono Consol Center as the shipper; 1701 Honolulu as the consignee; Matson™ as the carrier; May 1, 2016 as an effective date for a contract; no expiration date for the contract; a bill of lading origin of Compton, a port of loading of Los Angeles; and port of discharge of Honolulu; and a bill of lading discharge of Honolulu.

In some embodiments, the processor 602 generates the shipping matrix at least in part by performing steps 802-814 using multiple first data sets, second data sets, and/or third data sets. For example, the processor 602 may repeat steps 802-814 using data from multiple manifests, user preferences, and/or contracts to construct a shipping matrix that is multiple rows in length. In such an embodiment, each row can be associated with a particular shipping route, senders of goods, and/or recipient of goods.

In some embodiments, the processor 602 updates a row of the shipping matrix in response to receiving an updated (or modified) first data set, second data set, and/or third data set. For example, the processor 602 may have generated a particular row of the shipping matrix based on a particular first data set, second data set, and/or third data set. Thereafter, the processor 602 may receive an updated second data set, e.g., comprising new and/or different user preferences. The processor 602 may update one or more data fields associated with the row of the shipping matrix based on the updated second data set. For example, the processor 602 may perform one or more of steps 804-814 using the updated second data set to generate new data for use in the shipping matrix. The processor 602 may then update one or more data fields associated with the row of the shipping matrix using the new data.

The method continues at step 818 when the processor 602 receives a fourth data set associated with an invoice and comprising a first shipping cost. The first shipping cost may be associated with a monetary cost for transporting goods from a sender of goods to a recipient of the goods via a particular shipper. In some embodiments, the fourth data set comprises a shipper of goods, a sender of goods, a recipient of the goods, a consignee of the goods, the first shipping cost, and/or other information associated with the transport of goods. The processor 602 may receive the fourth data set from a remote computing device, server, database, a local memory 604, or any combination of these.

The method continues at step 820 when the processor 602 determines a second shipping cost associated with data from a row in the shipping matrix. For example, the processor can select a row of the shipping matrix based on a sender of goods, a recipient of goods, and/or other information provided in the fourth data set. The processor 602 may determine the second shipping cost using one or more algorithms, databases, and/or lookup tables and based on data from the selected row of the shipping matrix. For example, the processor 602 can access a lookup table to determine the second shipping cost based on a bill of lading origin, port of loading, port of discharge, bill of lading discharge, and/or another parameter from the selected row of the shipping matrix.

In some embodiments, the processor 602 may determine the second shipping cost based at least in part on other data (e.g., stored in memory 604). The other data may comprise data from the first data set, the second data set, the third data set, a container size, a type of good being transported, a date associated with the transportation of goods, a type of transportation vessel or vehicle, or any combination of these. For example, the processor 602 may determine the second shipping cost based at least in part on data from a row of the shipping matrix and a container size, a type of the goods being transported, and/or a date by which the shipment is scheduled to reach its destination.

As a particular example, in the embodiment described above relating to the transport of computer components, the processor 602 can consult a lookup table or use an algorithm to determine a shipping cost based on the goods being transported being computer components, the carrier being Matson™, the bill of lading origin being Compton, the port of loading being Lost Angeles, the port of discharge being Honolulu, and the bill of lading discharge location being Honolulu.

The method continues at step 822 when the processor 602 determines if the first shipping cost is within a tolerance range of the second shipping cost. For example, the processor 602 may compare the first shipping cost to the second shipping cost to determine a difference between the two. If the difference falls within the tolerance range, the method can continue to step 824. Otherwise, the method can continue to step 826.

In some embodiments, the tolerance range may comprise a dollar amount. For example, the processor 602 may compare the first shipping cost to the second shipping cost to determine if a difference between the two is less than or equal to, for example, $10.00. If so, the processor 602 may determine that the first shipping cost is within the tolerance range of the second shipping cost.

At step 824, the processor 602 outputs a notification indicating a positive result. For example, the processor 602 can transmit a notification to one or more entities indicating that the first shipping cost is within the tolerance range of the second shipping cost. In some embodiments, the processor 602 may transmit an electronic communication (e.g., via a network) configured to cause a remote computing device to indicate (e.g., via a graphical user interface output on a display) the positive result. For example, the processor 602 may output a notification indicating that the first shipping cost (e.g., from the invoice) is within $100.00 of the second shipping cost (e.g., derived from data in the shipping matrix).

At step 826, the processor 602 outputs a notification indicating a negative result. For example, the processor 602 can transmit a notification to one or more entities indicating that the first shipping cost is not within the tolerance range of the second shipping cost. In some embodiments, the processor 602 may transmit an electronic communication (e.g., via a network) configured to cause a remote computing device to indicate (e.g., via a graphical user interface output on a display) the negative result. For example, the processor 602 may output a notification indicating that the first shipping cost is not within $100.00 of the second shipping cost.

Figure 9:
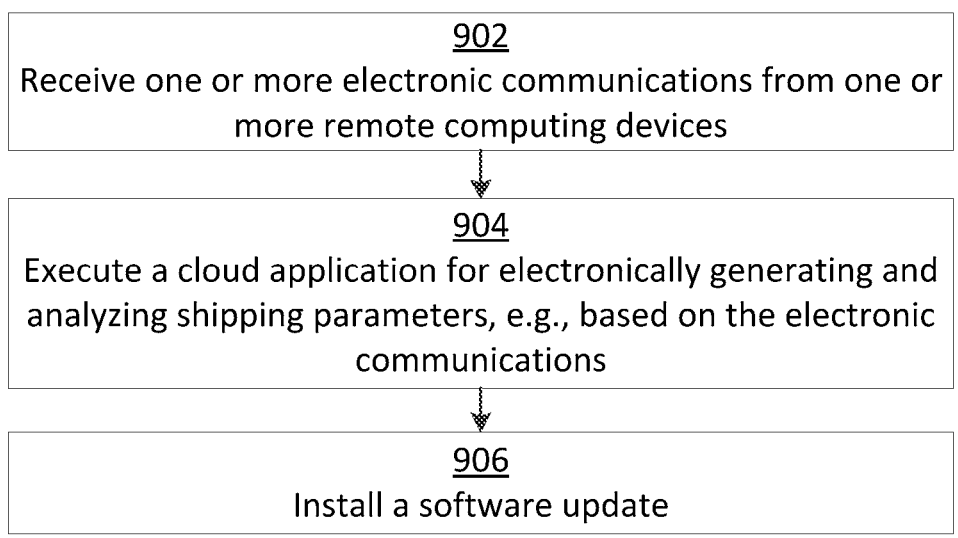
FIG. 9 is a flow chart of steps for performing another method for electronically generating and analyzing shipping parameters according to an embodiment.

FIG. 9 is a flow chart of steps for performing another method for electronically generating and analyzing shipping parameters according to an embodiment. In some embodiments, the steps in FIG. 9 may be implemented in program code that is executed by a processor, for example, the processor in a general purpose computer, a mobile device, or a server. In some embodiments, these steps may be implemented by a group of processors. In some embodiments, one or more steps shown in FIG. 9 may be omitted or performed in a different order. Similarly, in some embodiments, additional steps not shown in FIG. 9 may also be performed. For example, any of the steps shown in FIG. 8 may also be performed. In some embodiments, one or more of the steps shown in FIG. 8 may be sub-steps within one of the steps shown in FIG. 9. Further, for simplicity, the steps below are described with reference to components described above with regard to the computing device 600 shown in FIG. 6. But it should be understood that any electronic device described herein may be used to implement the steps below.

The method begins at step 902 when a processor 602 (e.g., associated with a cloud server or other cloud-computing device) receives one or more electronic communications from one or more remote computing devices. The processor 602 may be in communication with the one or more remote computing devices via a network, such as the Internet. The processor 602 may use the network to transmit data to, and receive data from, remote computing devices. For example, in one embodiment, the processor 602 can receive an electronic communication from a remote computing device associated with a shipping entity or a provider of goods via a network.

The method continues at step 904 when the processor 602 executes a cloud application for electronically generating and analyzing shipping parameters. The processor 602 may configure or otherwise execute the cloud application based on one or more commands from the one or more electronic communications. For example, the processor 602 may receive a "start" command from a remote computing device associated with a shipping entity or a provider of goods. Based on the start command, the processor 602 may execute the cloud application.

The processor 602 can control the execution of the cloud application, e.g., to maximize processing speeds and/or reduce memory usage. For example, in some embodiments, the processor 602 may be comprised within a cloud server in a cloud-computing environment. In such an embodiment, the cloud server can execute the cloud application. In some embodiments, a cloud-computing environment can include multiple processors and/or servers that concurrently process or otherwise execute portions of the cloud application. Such a cloud-computing environment may provide for centralized development, installation, updating, monitoring, and/or maintenance of the cloud application and/or cloud-computing environment.

The method continues at step 906 when the processor 602 installs a software update. In some embodiments, the software update may comprise a security patch, a software application configured to increase a processing speed of the cloud-computing environment above a threshold, another software application configured to reduce memory usage of the cloud-computing environment below another threshold, or any combination of these. The processor 602 may receive program code associated with the software update from a database, a computer-readable medium, over a network, etc. The processor can execute the program code to install the software update.

For example, the processor 602 can install a software update configured to add new features to a cloud computing application stored in a cloud-computing environment. This may provide entities using the cloud-computing environment with new options or features for generating and analyzing shipping parameters. For example, the software update may provide a shipping entity with an ability to transmit replacement invoices or other replacement data to the cloud computing environment for use in auditing a shipping cost or generating a shipping matrix.

Although the present disclosure has been provided with reference to particular embodiments, it should be recognized that these embodiments are merely illustrative of the principles of the present disclosure. Those of ordinary skill in the art will appreciate that systems, methods, and computer readable media according to the present disclosure may be constructed and implemented in other ways and embodiments. Accordingly, the description herein should not be read as limiting, as other embodiments also fall within the scope of the present disclosure. Numerous modifications and adaptations thereof will be apparent to those skilled in the art without departing from the spirit and scope of this disclosure.

What is claimed is:

1. A method implemented by one or more cloud-computing applications executing on one or more cloud servers in a cloud-computing environment, the method comprising:
   generating, by one or more processors of the one or more cloud servers, a web portal accessible to a first shipping entity and a second shipping entity via an Internet connection;
   receiving, by the one or more processors, a first data set associated with a shipping manifest from the first shipping entity through the web portal;
   receiving, by the one or more processors, a second data set associated with a user preference through the web portal;
   generating, by the one or more processors, a shipping matrix associated with a plurality of shipping routes based at least in part on the first data set and the second data set;
   receiving, by the one or more processors, a third data set from the second shipping entity through the web portal, the third data set being associated with an invoice and comprising a first shipping cost;
   determining, by the one or more processors, a particular row of the shipping matrix based on the third data set;
   determining, by the one or more processors, a second shipping cost based on data from the particular row of the shipping matrix;
   determining, by the one or more processors, if the first shipping cost is within a predefined tolerance range of the second shipping cost; and
   outputting, by the one or more processors, an indication in the web portal of whether the first shipping cost is within the predefined tolerance range of the second shipping cost.

2. The method of claim 1, wherein generating the shipping matrix comprises:
   determining a first plurality of shipping parameters based on the first data set and comprising at least two of: a shipping company identifier, a consignee identifier, or a carrier identification; and
   including the first plurality of shipping parameters in the shipping matrix.

3. The method of claim 2, wherein generating the shipping matrix further comprises:
   determining a second plurality of shipping parameters based at least in part on the first plurality of shipping parameters and the second data set using a second database, the second plurality of shipping parameters comprising at least two of: a bill of lading origin, a bill of lading destination, a port of loading, or a port of discharge; and
   including the second plurality of shipping parameters in the shipping matrix.

4. The method of claim 3, further comprising receiving a fourth data set comprising contract data, wherein generating the shipping matrix further comprises:
   determining a third plurality of shipping parameters based on the fourth data set; and
   including the third plurality of shipping parameters in the shipping matrix.

5. The method of claim 1, wherein generating the shipping matrix further comprises:
   receiving a sensor signal from a global positioning system (GPS) unit, the sensor signal associated with a location of a mobile device; and
   generating at least a portion of the shipping matrix based on the location of the mobile device.

6. The method of claim 1, further comprising installing a software update on at least one of the one or more cloud servers, the software update comprising:
   a security patch,
   a first software application configured to increase a processing speed of the cloud-computing environment above a first threshold; or
   a second software application configured to reduce a memory usage of the cloud-computing environment below a second threshold.

7. The method of claim 1, further comprising:
   transmitting an electronic communication via the Internet connection to a remote computing device, the electronic communication configured to cause the remote computing device to indicate via a customized graphical user interface (GUI) whether the first shipping cost is within the predefined tolerance range of the second shipping cost.

8. A non-transitory computer readable medium comprising program code for one or more cloud-computing applications, which when executed by one or more processors of one or more cloud servers in a cloud-computing environment are configured to cause the one or more processors to:
   generate a web portal accessible to a first shipping entity and a second shipping entity via an Internet connection;
   receive a first data set associated with a shipping manifest from the first shipping entity through the web portal;
   receive a second data set associated with a user preference through the web portal;
   generate a shipping matrix associated with a plurality of shipping routes based at least in part on the first data set and the second data set;
   receive a third data set from the second shipping entity through the web portal, the third data set being associated with an invoice and comprising a first shipping cost;
   determine a particular row of the shipping matrix based on the third data set;
   determine a second shipping cost based on data from the particular row of the shipping matrix;
   determine if the first shipping cost is within a predefined tolerance range of the second shipping cost; and
   output an indication in the web portal of whether the first shipping cost is within the predefined tolerance range of the second shipping cost.

9. The non-transitory computer readable medium of claim 8, further comprising program code which when executed by the one or more processors is configured to cause the one or more processors to generate the shipping matrix by:
   determining a first plurality of shipping parameters based on the first data set and comprising at least two of: a shipping company identifier, a consignee identifier, or a carrier identification; and
including the first plurality of shipping parameters in the shipping matrix.

10. The non-transitory computer readable medium of claim 9, further comprising program code which when executed by the one or more processors is configured to cause the one or more processors to generate the shipping matrix by:
determining a second plurality of shipping parameters based at least in part on the first plurality of shipping parameters and the second data set using a second database, the second plurality of shipping parameters comprising at least two of: a bill of lading origin, a bill of lading destination, a port of loading, or a port of discharge; and
including the second plurality of shipping parameters in the shipping matrix.

11. The non-transitory computer readable medium of claim 10, further comprising program code which when executed by the one or more processors is configured to cause the one or more processors to generate the shipping matrix further at least in part by:
receiving a sensor signal from a global positioning system (GPS) unit, the sensor signal associated with a location of a mobile device; and
generating at least a portion of the shipping matrix based on the location of the mobile device.

12. The non-transitory computer readable medium of claim 8, further comprising program code which when executed by the one or more processors is configured to cause the one or more processors to:
install a software update on at least one of the one or more cloud servers, wherein the software update comprises:
a security patch,
a first software application configured to increase a processing speed of the cloud-computing environment above a first threshold; or
a second software application configured to reduce a memory usage of the cloud-computing environment below a second threshold.

13. The non-transitory computer readable medium of claim 8, further comprising program code, which when executed by the one or more processors is configured to cause the one or more processors to:
transmit an electronic communication via the Internet connection to a remote computing device, the electronic communication configured to cause the remote computing device to indicate via a customized graphical user interface (GUI) whether the first shipping cost is within the predefined tolerance range of the second shipping cost.

14. The non-transitory computer readable medium of claim 8, further comprising program code, which when executed by the one or more processors is configured to cause the one or more processors to:
receive a fourth data set comprising contract data;
determine a third plurality of shipping parameters based on the fourth data set; and
include the third plurality of shipping parameters in the shipping matrix.

15. A cloud-computing system comprising:
one or more cloud servers comprising one or more processors; and
one or more memory devices comprising program code that is executable by the one or more processors for causing the one or more processors to:
generate a web portal accessible to a first shipping entity and a second shipping entity via an Internet connection;
receive a first data set associated with a shipping manifest from the first shipping entity through the web portal;
receive a second data set associated with a user preference;
generate a shipping matrix associated with a plurality of shipping routes based at least in part on the first data set and the second data set;
receive a third data set from the second shipping entity through the web portal, the third data set being associated with an invoice and comprising a first shipping cost;
determine a particular row of the shipping matrix based on the third data set;
determine a second shipping cost based on data from the particular row of the shipping matrix;
determine if the first shipping cost is within a predefined tolerance range of the second shipping cost; and
output an indication in the web portal of whether the first shipping cost is within the predefined tolerance range of the second shipping cost.

16. The cloud-computing system of claim 15, wherein the one or more memory devices further includes program code that is executable by the one or more processors for causing the one or more processors to generate the shipping matrix by:
determining a first plurality of shipping parameters based on the first data set and comprising at least two of: a shipping company identifier, a consignee identifier, or a carrier identification; and
including the first plurality of shipping parameters in the shipping matrix.

17. The cloud-computing system of claim 16, wherein the one or more memory devices further include program code that is executable by the one or more processors for causing the one or more processors to generate the shipping matrix by:
determining a second plurality of shipping parameters based at least in part on the first plurality of shipping parameters and the second data set using a second database, the second plurality of shipping parameters comprising at least two of: a bill of lading origin, a bill of lading destination, a port of loading, or a port of discharge; and
including the second plurality of shipping parameters in the shipping matrix.

18. The cloud-computing system of claim 17, wherein theone or more memory devices further include program code that is executable by the one or more processors for causing the one or more processors to generate the shipping matrix at least in part by:
receiving a fourth data set comprising contract data;
determining a third plurality of shipping parameters based on the fourth data set; and
including the third plurality of shipping parameters in the shipping matrix.

19. The cloud-computing system of claim 15, wherein the one or more memory devices further include program code that is executable by the one or more processors for causing the one or more processors to generate the shipping matrix at least in part by:

receiving a sensor signal from a global positioning system (GPS) unit, the sensor signal associated with a location of a mobile device; and generating at least a portion of the shipping matrix based on the location of the mobile device.

20. The cloud-computing system of claim 15, wherein the one or more memory devices further include program code that is executable by the one or more processors for causing the one or more processors to:

transmit an electronic communication via the Internet connection to a remote computing device, the electronic communication configured to cause the remote computing device to indicate via a graphical user interface (GUI) whether the first shipping cost is within the predefined tolerance range of the second shipping cost.

* * * * *